United States Patent [19]

Robings

[11] Patent Number: 4,705,374

[45] Date of Patent: Nov. 10, 1987

[54] TILTING VIEWFINDER AND VIDEO DOOR ACCESSORY FOR MOTION-PICTURE CAMERA

[75] Inventor: Kenneth W. Robings, Santa Monica, Calif.

[73] Assignee: Clairmont Camera, Inc., Studio City, Calif.

[21] Appl. No.: 906,137

[22] Filed: Sep. 11, 1986

[51] Int. Cl.⁴ .............................................. G03B 13/08
[52] U.S. Cl. ..................................... 354/225; 352/72; 354/223; 358/224
[58] Field of Search .............. 354/219, 222, 223, 224, 354/225; 352/142, 72; 358/224

[56] References Cited

U.S. PATENT DOCUMENTS 2,709,391  5/1955  Reeves ................................ 358/224

FOREIGN PATENT DOCUMENTS 1123543   9/1956   France ................................ 354/224
139758    8/1982   Japan .................................. 354/224
2076177  11/1981   United Kingdom ................. 354/225

*Primary Examiner*—Monroe H. Hayes

*Attorney, Agent, or Firm*—Romney, Golant Martin Seldon & Ashen

[57] ABSTRACT

A case hinges to the side of the movie camera next to the ground glass. One end of a viewfinder tube mounts pivotally to the case; the other supports an ocular. Light from the inverted image on the ground glass passes, at a right angle to the camera side, into the case. An Amici prism in the case reerects the image and reflects the light rearward to a beam splitter. The splitter passes part of the light rearward to a 45°/90° prism and then upward through a lens and iris to a video port and neutral-density filter. The beam splitter deflects the rest of the light outward, at a right angle to the camera side, into the finder tube. There another 45°/90° prism (that rotates with the tube) deflects the light rearward in the tube to a lens that reimages the scene at the ocular. The movie camera can thus be tilted while the tube and ocular are at constant height, but prism rotation twists the image about the optical path. To correct this, a Pechan prism between the lens and the ocular is linked to rotate about the path when the finder tube pivots. The Pechan prism counterrotates the image. (The lens and Pechan prism introduce two additional image inversions.) In the finder are also a filter wheel and optional 2× reducing lens.

27 Claims, 13 Drawing Figures

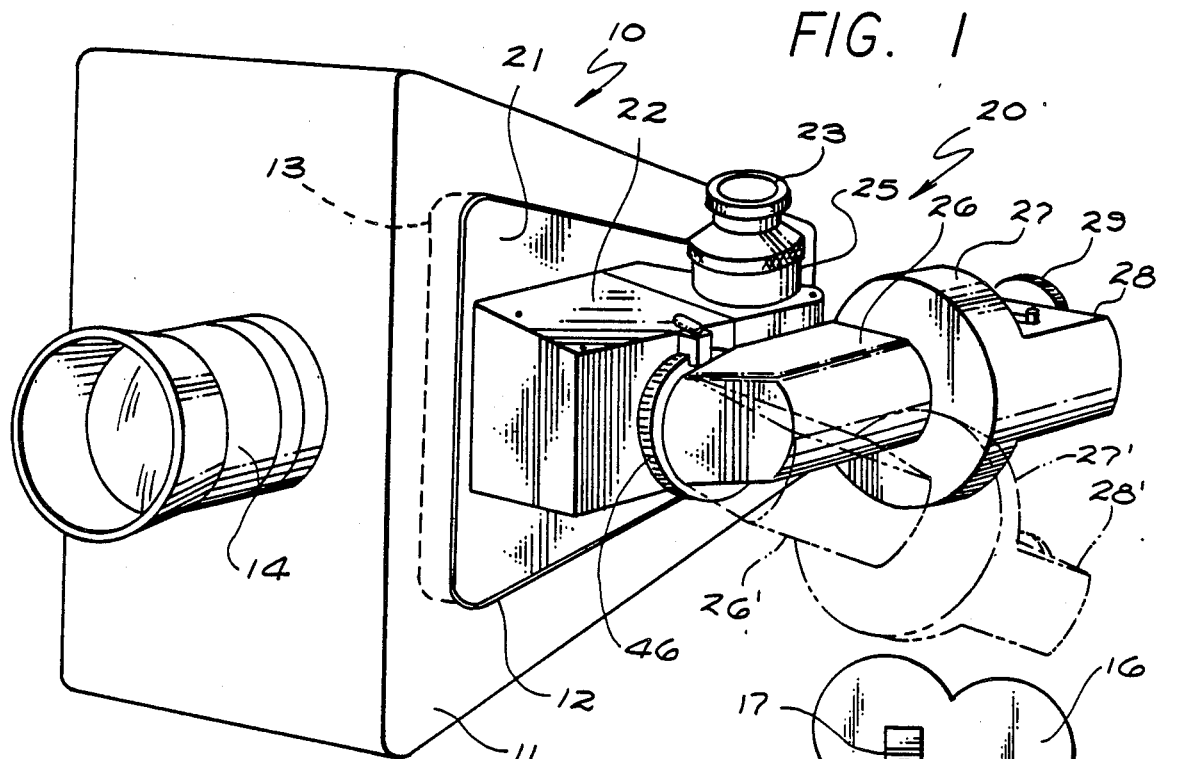
FIG. 1
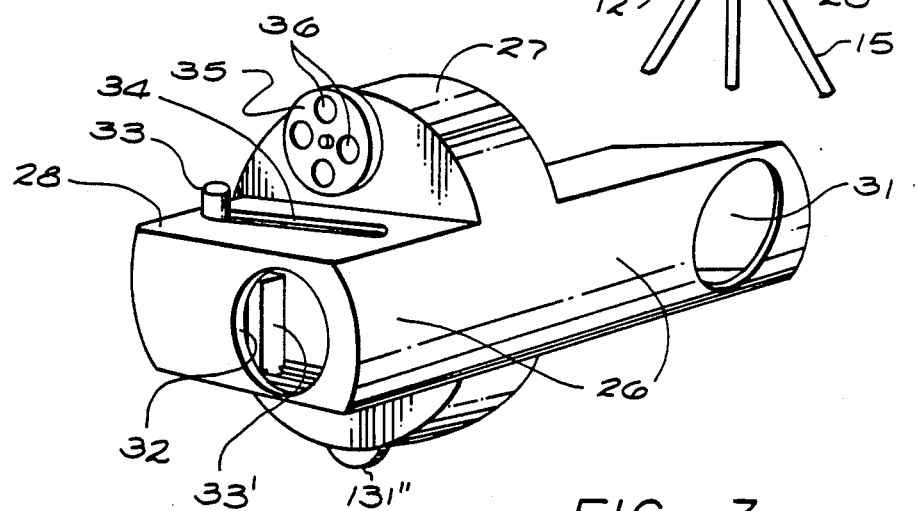
FIG. 2
FIG. 3

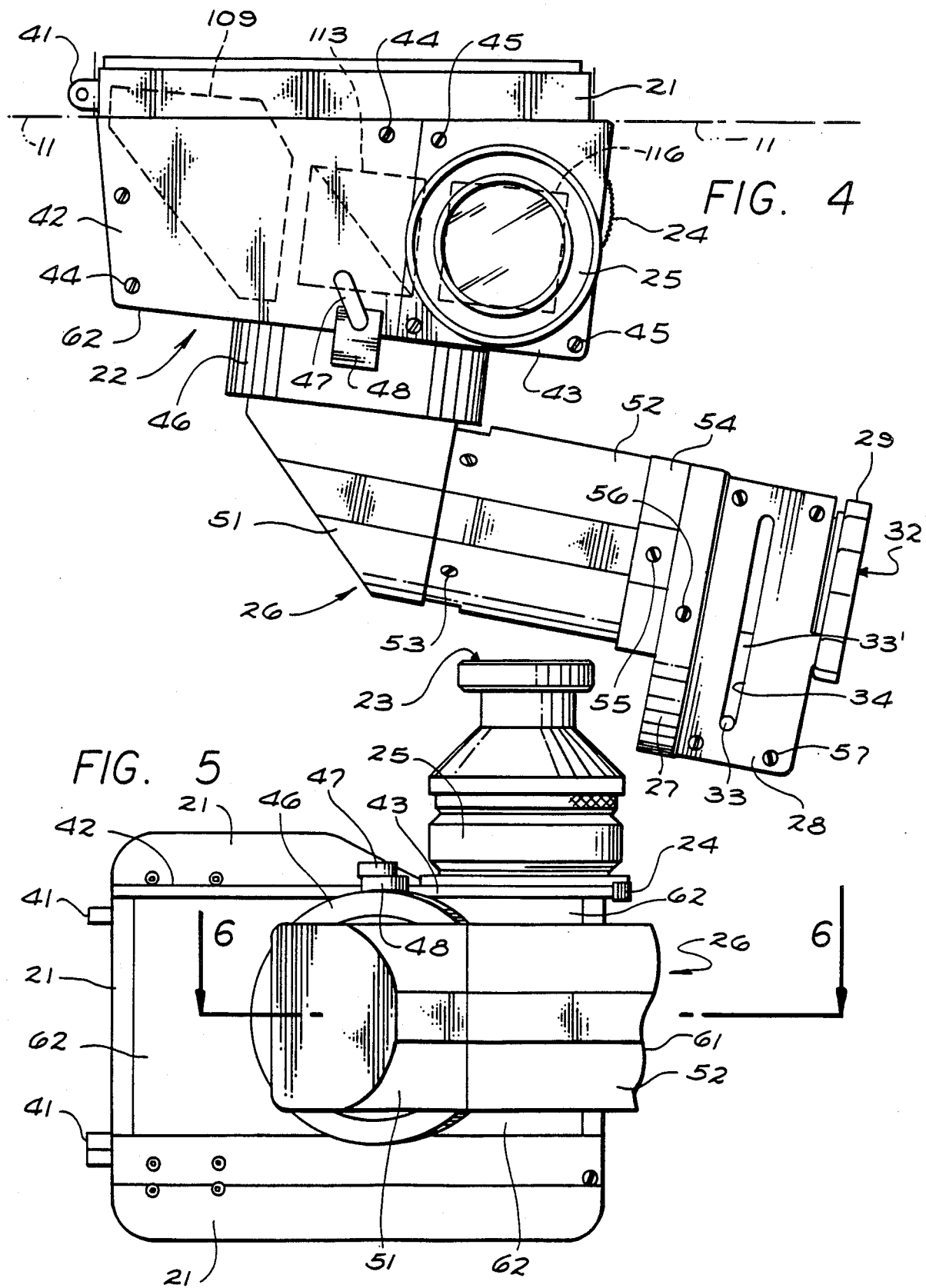

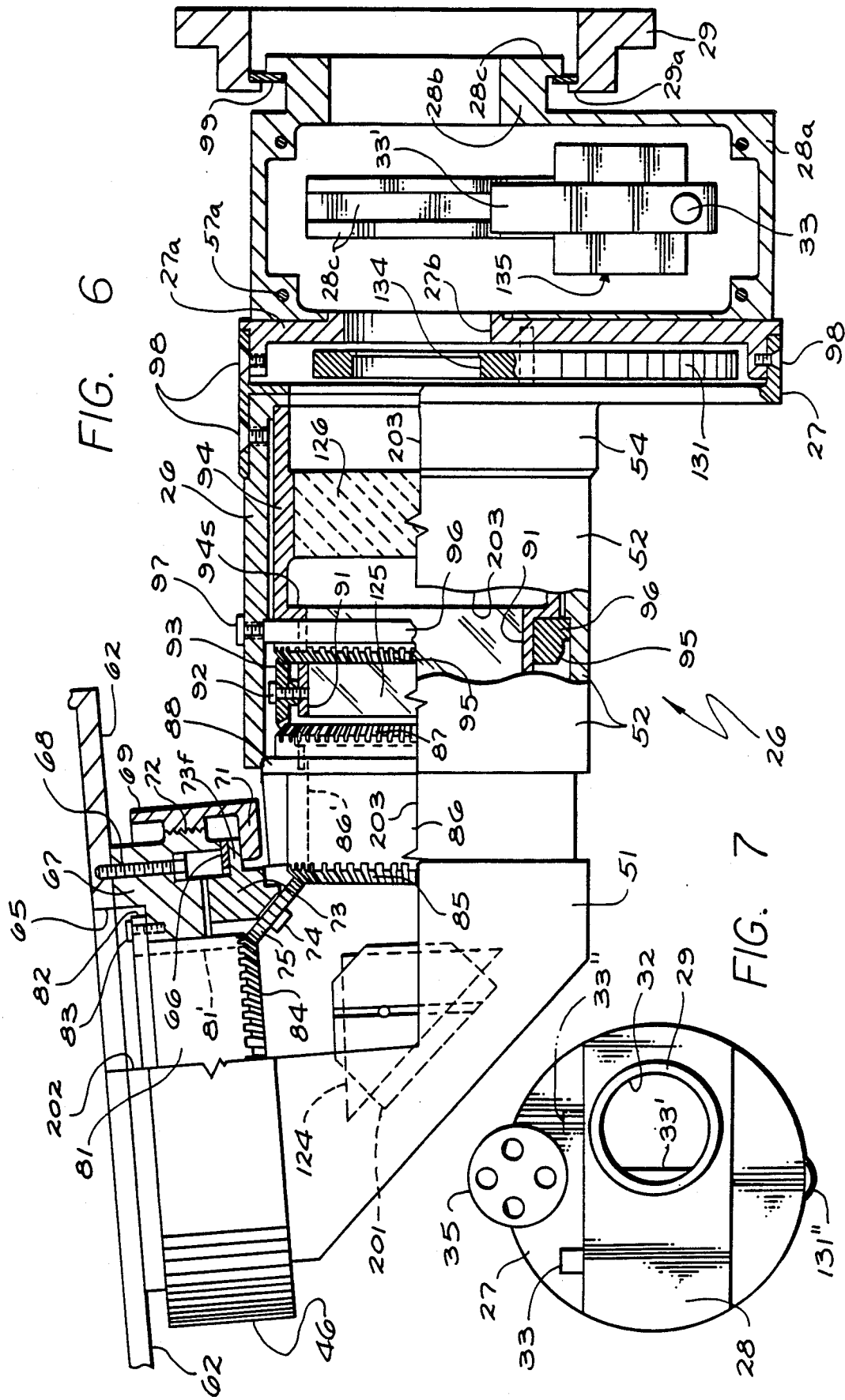

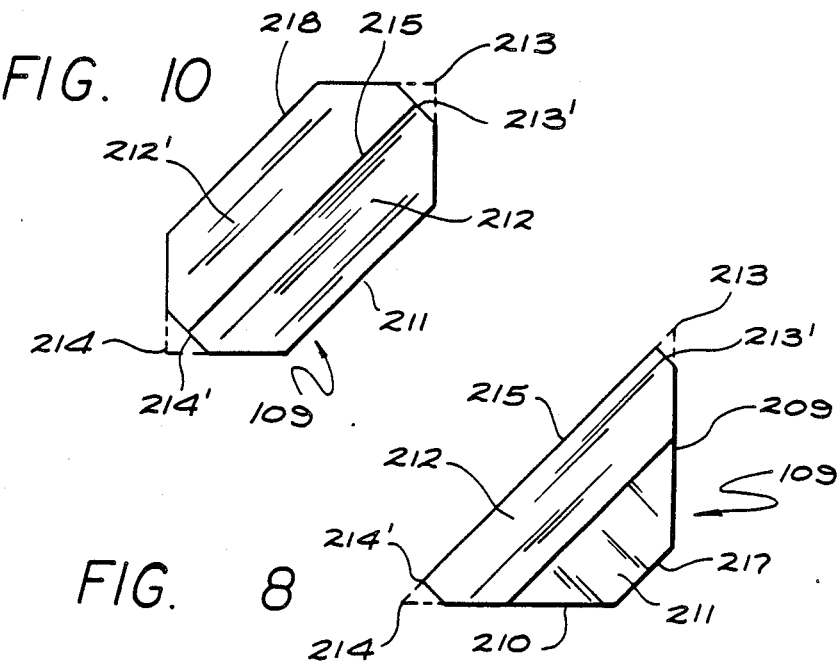
FIG. 10
FIG. 8
FIG. 9
FIG. 11
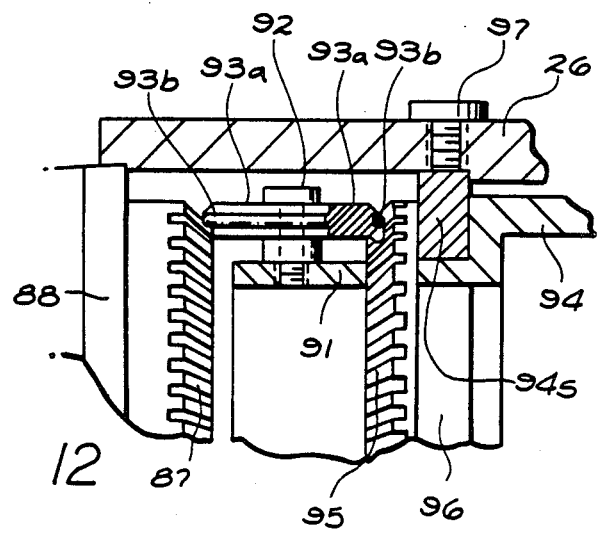
FIG. 12

TILTING VIEWFINDER AND VIDEO DOOR ACCESSORY FOR MOTION-PICTURE CAMERA

BACKGROUND

1. Field of The Invention

This invention relates generally to cinematography; and more particularly to accessories for professional thirty-five millimeter motion-picture cameras.

The invention is an accessory for use with the cameras available commercially under the names of Arriflex ®  (models IIc, III and IIIc), Mitchel ®  (model Mark VI) and BNCR ® . It permits a user to hold the viewfinder at a constant height while tilting the camera vertically, and also permits simultaneous monitoring or recording by a video camera.

2. Prior Art

Tilt viewfinders are known, as are video taps—but when one attempts to combine the two, difficulties arise. My invention resolves these problems. A review of currently available viewfinder accessories and video-camera attachment accessories will serve to delineate the problems resolved by my invention.

It is known to provide a viewfinder that can be held at constant height while the camera tilts. Arriflex offers such a finder, but it is not compatible with video monitoring.

More specifically, the Arriflex finder contains a custom prism that performs three functions (for reasons that will be discussed below). First, it deflects light from the motion-picture camera ground glass rearward (relative to the camera) along a path parallel to the side of the camera. Secondly, it then deflects the light again, outward at right angles into a viewfinder tube. Thirdly, it provides an inversion of the image.

Since a single, unitary prism performs all three functions, there is no way to tap part of the beam out of the custom prism itself to a video-camera port.

Furthermore, the forward portion of the custom prism is immediately adjacent to the ground glass; and the finder tube, similarly, is immediately adjacent to the rearward end of the prism. Hence there is no practical point in the nonpivoting part of the optical train to interpose a beam splitter, to tap part of the beam to a video port—at least not without making the unit objectionably much wider.

It might be possible to place such a splitter in the pivoting finder tube, but that would be most awkward and unsatisfactory as the user would have to manually support the video camera weight, suspended on the pivoting tube.

One might suppose that it would be possible simply to dispose of the custom Arriflex prism and place a beam-splitting prism adjacent to the ground glass—to divert part of the light upward or rearward to a video port, while passing the remainder straight out from the side of the motion-picture camera into the pivoting finder tube.

Such a solution while perhaps seductively simple is unacceptable because of the proximity of the ground glass to the front of the motion-picture camera, in combination with the necessary bulkiness of the finder-tube pivot point. In such a device the front end of the finder tube would be extremely close to the plane of the front of the camera, and might even extend beyond that plane.

In any of such positions the finder tube would interfere with installation, adjustment, operation, and/or use of many of the large lenses modernly employed in professional cinematography. Thus the first two functions of the Arriflex custom prism mentioned above are important to practical use of a tilt viewfinder, and cannot be readily eliminated in the interest of adding a video tap.

Moreover, the image-inversion provided by the Arriflex custom prism is also important. As has been mentioned, the image on the ground glass of the motion-picture camera is inverted. This inversion is corrected by a reimaging or "relay" lens in the finder tube, which lens itself provides an inversion. For purposes of simplicity in this document, I will describe provision of an inversion of an already-inverted image as "reerecting" the inverted image. Thus the relay lens reerects the ground-glass image.

Unfortunately, however, there is another image inversion in the system. It arises as follows.

A ninety-degree/forty-five-degree prism is positioned in the front end of the finder tube. This prism has the function of receiving outward-directed light rays from the Arriflex custom prism and deflecting them along the interior of the finder tube—which is, very generally, parallel to the side of the motion-picture camera. This ninety-degree/forty-five-degree prism consequently must rotate with the pivoting finder tube.

When the finder tube pivots, relative to the camera, away from a mutually level condition (that is to say, if the finder tube is not pointing straight back along the side of the camera), the ninety-degree/forty-five-degree prism in effect introduces a "twisting" of the image. In other words, the image within the viewfinder tube rotates about the optical path in proportion to the pivot angle of the tube.

To correct for this twisting of the image, a Pechan prism is mechanically rotated about the optical path within the tube, between the relay lens and the ocular. This prism, when rotated by the correct amount, counterrotates the image just enough to maintain it vertical—but not right-side-up! That is to say, this prism also introduces an inversion.

Thus the Arriflex custom prism mentioned earlier, in addition to moving the image point rearward from the ground glass to clear the front of the camera, also reerects the image to compensate for inversion at the Pechan prism. For both these reasons the Arriflex custom prism cannot be simply discarded: any workable solution must somehow preserve these functions, while adding compatibility with a video tap.

Another area of pertinent prior art is that of known "video door" accessories—so called because such units are built into panels that replace the standard "door" at the viewing side of the motion-picture camera. Video doors are available in combination with stationary viewfinders—that is to say, viewfinders that are fixed in viewing angle with respect to the body of the motion-picture camera.

The commonly encountered form of such devices consists of (1) a ninety-degree/forty-five-degree prism adjacent to the ground glass in the motion-picture camera, redirecting light from the ground glass rearward, generally parallel to the side of the motion-picture camera; (2) a cube beam splitter behind the ninety-degree/forty-five-degree prism; (3) a relay lens and ocular along the "straight through" path from the splitter; and (4) an upward-deflecting ninety-degree/forty-fivedegree prism, followed by a video lens, iris and video camera, along the diverted path from the splitter.

This simple arrangement is satisfactory because the ninety-degree/forty-five-degree prism at the front of such a nonpivoting finder, next to the ground glass, does not require a bulky housing. Consequently the image need not be moved, as in the Arriflex tilt finder, rearward before passage outward into a viewfinder tube.

Now returning to discussion of the Arriflex tilt viewfinder, certain other points bear mention. It is certainly not my intention to criticize the Arriflex unit, a very fine optical instrument; nevertheless I feel that even devices of the highest quality are subject to refinement in small ways, and in the instance of the Arriflex tilt viewfinder it has been noted that the mechanical linkage that drives the Pechan prism must be of extremely high-quality construction to minimize backlash.

As will be recalled, the Pechan prism merely corrects for image twist when the viewfinder tube is pivoted relative to the camera. A small amount of backlash in the prism-drive linkage therefore only leaves the image at the ocular cocked very slightly away from vertical. It might be supposed, accordingly, that a small amount of backlash would be inconsequential.

In practice, however, small amounts of backlash in this mechanism become relatively conspicuous because if backlash is present the image-twist correction does not change smoothly and continuously with pivoting of the finder tube. The image, in effect, "jumps" or "jerks" whenever the tube pivoting direction is reversed.

Since, to the observing cinematographer, the image is always approximately vertical, these erratic dislocations are not superimposed upon a visible large rotation of the image—but rather are seen isolated, and thus appear quite conspicuous. They may also seem (perhaps quite unjustly) to represent quirky, erratic operation.

In amateur photography such matters may be a minor annoyance, but in professional cinematography such an effect is irksome to the extreme. Motion pictures are made under conditions of extraordinary demands and great tension—due to intense concentration on the technical and artistic considerations, coupled with enormous pressure of time, cost and the temperament of directors, actors and others. Within this context a jumping, jerking image in a viewfinder may become an entirely intolerable irritant.

In the Arriflex device this effect is largely avoided, but only by employing extremely fine machining tolerances, and consequently at relatively high cost. Provision of a stable image at more moderate expense would be desirable. To understand this problem it will be helpful to have an understanding of the mechanical linkage which is used in the Arriflex accessory to control the Pechan prism.

That linkage includes four ring gears, a smaller spur gear that transmits motion around a corner between the finder-tube pivot mechanism and the "downstream" parts of the tube itself, and a planetary gear. The linkage operates as follows.

One ring gear is fixed with respect to the motion-picture camera, and is coaxial with the pivoting mechanism of the viewfinder tube. The spur gear is rotatably fixed to the tube but meshed with the stationary ring gear—so that when the tube pivots, the spur must roll along the ring gear. Thus when the tube pivots, the ring gear forces the spur gear to rotate on its own axis.

The linkage also includes a metal cylinder that is mounted for rotation on its own axis, within the viewfinder tube. Ring gears are formed on both of ends of this cylinder: the ring gear on one end (the nearer) is meshed with the spur gear—so that when the tube pivots, the spur gear forces the cylinder to rotate. The ring gear on the remote end of the cylinder of course rotates as well, transmitting the pivoting motion of the tube itself to a point adjacent the Pechan prism. That remote gear may accordingly be called the motion-transmitting ring gear.

The Pechan prism is carried within a barrel which is rotatably fixed within the tube, for rotation about the optical path within the tube. A planetary gear is mounted to the periphery of this barrel for rotation with the barrel and also for rotation about the axis of the planetary gear itself. The gear axis is fixed relative to the barrel.

The planetary gear is in mesh with the ring gear on the remote end of the rotating cylinder, i.e., the motion-transmitting gear, and also in mesh with yet another ring gear—one that is fixed within the viewfinder tube. Consequently, when the tube pivots, the transmitting gear forces the axis of the planetary element to roll along the fixed gear and thus rotate about the optical path.

When the planetary moves about the optical path in this way, its axis is moving, and with it the Pechan-prism barrel mount to which the planetary axis is fixed. Hence the prism rotates about the optical path.

An important characteristic of the planetary drive—when operating against the final, fixed ring gear—is that the axis of the planetary only moves about the optical path through half the angle of rotation of the motion-transmitting gear. Consequently the barrel holding the Pechan prism likewise rotates only about the optical path through half the angle of rotation of the motion-transmitting gear. This relationship is appropriate because the Pechan prism has the property of twisting the image through an angle that is twice its own angle of rotation from the noncorrecting orientation.

From this description it may be understood that the Pechan-prism drive linkage has no fewer than four pairs of meshed gear teeth, and that the tolerances in these eight sets of teeth are additive in determining the backlash of the overall mechanism. This fact, coupled with the fact that the mechanism ends in an optical display which is virtually ideal for isolating and displaying the results of even tiny residual backlash, makes the transmission of motion to the Pechan prism an extremely fussy problem.

If economy is added to these considerations the problem becomes more than fussy. Yet resolution of this problem in an economical way is extremely desirable.

Another problem arises in the use of tilt viewfinders, even without reference to the desirability of adding video doors. This is only a problem for some practitioners, and perhaps a problem of lesser magnitude than those discussed above. This problem arises from the fact that the Arriflex tilt viewfinder accessory is aligned very close to the left side of the motion-picture camera itself.

It must be understood that on the top of the camera and extending both upward and toward the rear there is generally a very bulky film magazine. When the camera is tilted upward the film magazine moves rearward and downward. In these circumstances the viewfinder is typically being held approximately level, extending rearward from the frontal part of the left side of the camera.

Thus the film magazine moves progressively into the region immediately to the right of the ocular. If the cinematographer sights through the viewfinder with her or his right eye, the magazine clears the right side of the head by an inch or two.

To obtain this amount of clearance, the Arriflex viewfinder tube is mounted at a small angle (about ten degrees) to the side of the camera, diverging, toward the rear, from the left side of the camera. In addition the pivotal axis of the tube is at a slight angle (about six degrees) off the normal to the side of the camera—so that the finder tube swings out even further, though only slightly, as the camera tilts upward or downward.

This arrangement is regrettably quite inadequate for the cinematographer who habitually sights through the finder using the left eye. There are surprisingly many of such individuals, who must make a hard choice among three possibilities: using the right eye, squatting to bring the finder tube to a low enough point to obtain the necessary clearance, and being beheaded by the film magazine. In cinema work these choices may all be regarded as equally appealing.

Therefore, as a practical matter, providing a "left-eyed" tilt viewfinder would also be very desirable.

SUMMARY OF THE DISCLOSURE

My invention is an accessory video door and tilt viewfinder for use with an ocular and with a video camera, and with a motion-picture camera. The accessory includes a case that is adapted to be supported from the motion-picture camera adjacent to the ground-glass viewport within the camera. The case is also adapted to form a substantially light-tight seal with the motion-picture camera.

In use, the case accepts from the image, very near the front of the motion-picture camera, light rays that are generally at a right angle to the side of the camera.

The accessory also includes a viewfinder tube having two ends. A first one of the ends is pivotally mounted to the case, and it forms a substantially light-tight seal with the case. In use, the tube receives from the case light rays originating from the ground-glass image.

The accessory further includes an attachment port, defined at the second end of the tube, for mounting of the ocular, and a reflector fixed within the tube near the first end, for receiving light rays from the case. In use the reflector receives these rays generally at a right angle to the side of the motion-picture camera, and deflects the received light along a pivoting optical path, within the tube, that is very generally parallel with that side of the motion-picture camera.

In addition, the accessory includes a relay lens, substantially fixed within the tube, for receiving deflected light from the reflector and relaying the image to a point near the ocular for viewing. The lens also has the effect of inverting the image.

Moreover, because the reflector is fixed within the tube and pivots with the tube, the relayed image at the viewing point is subject to rotation about the pivoting optical path. To compensate for this image rotation, which would make the apparatus very confusing for a person attempting to view the image through the finder, the accessory includes a Pechan prism, rotatably secured within the tube, for counterrotating the relayed image. The Pechan prism also, however, has the effect of inverting the image.

My invention also includes an Amici prism, disposed within the case, for redirecting light rays from the image on the ground glass along a fixed optical path within the case and for inverting the image to compensate for inversion by the Pechan prism. The redirected rays proceed along this path rearward of the motion-picture camera and generally parallel to the side of the motion-picture camera.

(It is indicate here and in certain of the appended claims, to aid in conceptualizing my invention in the context of the prior art, that the relay lens reerects the inverted image on the ground glass, and that the Amici prism compensates for inversion by the Pechan prism. In other words, the inverting action of the lens has been associated with the original inversion at the ground glass, and the inverting actions of the two prisms have been associated with one another. It will be understood that these associations are arbitrary. In a more fundamental sense there are three inversions within my apparatus, and this odd number of inversions of the inverted image on the ground glass results in an erect image for viewing.)

The accessory yet additionally includes a video attachment port in the case, behind the Amici prism relative to the motion-picture camera, for attachment of the video camera to monitor the scene that is imaged on the ground glass.

My invention yet further includes a beam-splitting prism that (1) passes part of the light from the Amici prism rearward of the motion-picture camera to the video attachment port, and (2) deflects part of the light from the Amici prism generally at a right angle to the fixed optical path, for passage to the reflector within the viewfinder tube.

By virtue of the configuration of elements just described, the Amici prism and beam-splitting prism in combination facilitate reimaging of the scene at the video camera. What is more, they also effectively move the ground-glass image rearward of the motion-picture camera, away from the front of the camera, for passage into the finder tube. This combination of two separate elements thus achieves what the custom prism in the Arriflex accessory cannot achieve—namely, to provide a point for tapping off an auxiliary beam to the video camera, while also permitting practical operation of a tilt finder with an erect image.

Hence the invention achieves several advantageous results: the tube is clear of the front of the motion-picture camera; the cameras and ground-glass image, as well as the accessory case, may be tilted vertically while the viewfinder tube and relayed image, with the ocular, may be held at a substantially unchanged position vertically; and despite such tilting the relayed image is maintained substantially erect.

While the foregoing summary may describe my invention in its most basic form or embodiment, I prefer to incorporate certain specific advantageous features to enhance practice of the invention. One such preferred feature is that, in use, the relay lens reimages the ground-glass image between the Pechan prism and the ocular.

Another advantageous feature which I prefer is a motional relay device mounted to the tube, actuated by pivoting of the tube relative to the case, and operatively connected to rotate the Pechan prism about the pivoting optical path to effect the compensation.

The motional relay device may take any of a number of different forms, including for example hydraulic or cable drives. My own preference now, however, is for a system that is composed at least partially of gears. I prefer to provide a ring gear fixed with respect to the case; and a spur, rotatably fixed to the tube and engaged with the ring gear, for rotation by the ring gear in response to pivoting of the tube relative to the case.

The preferred apparatus also includes some means for transmitting motion—derived from rotation of the spur—along the tube toward the second end of the tube. For purposes of generality in expression, I shall refer to these means as "motional transmission means." The motional transmission means are operably mounted to the tube for actuation by the spur.

The preferred apparatus also includes a barrel rotatably fixed within the tube for rotation about the pivoting optical path, and carrying the Pechan prism, and operatively connected for rotation by the motional transmission means.

The motional transmission means is a part of the motional relay device mentioned earlier, and like that larger group of elements may make use of hydraulic, cable or other drive types, though I prefer a system of three additional ring gears and a planetary element.

That preferred system and numerous other advantageous forms of my invention will be described more specifically in the Detailed Description section that follows. It will be noted here that both the spur and the planetary element may be ordinary gears, but I prefer to use a friction wheel—such as a pulley-like wheel carrying an elastomeric O-ring that serves as a drive surface—to minimize backlash in the Pechan-prism drive.

My invention may also be understood to include not only the accessory itself, but the greater combination of the accessory with the ocular, or with the video camera, or indeed with the motion-picture camera—or with any combination of these devices.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a perspective drawing of a preferred embodiment of my invention, installed on a representative motion-picture camera. This view is taken from the front left of the camera, and also shows certain details in dashed and phantom lines, as will be explained shortly.

Figure 13:
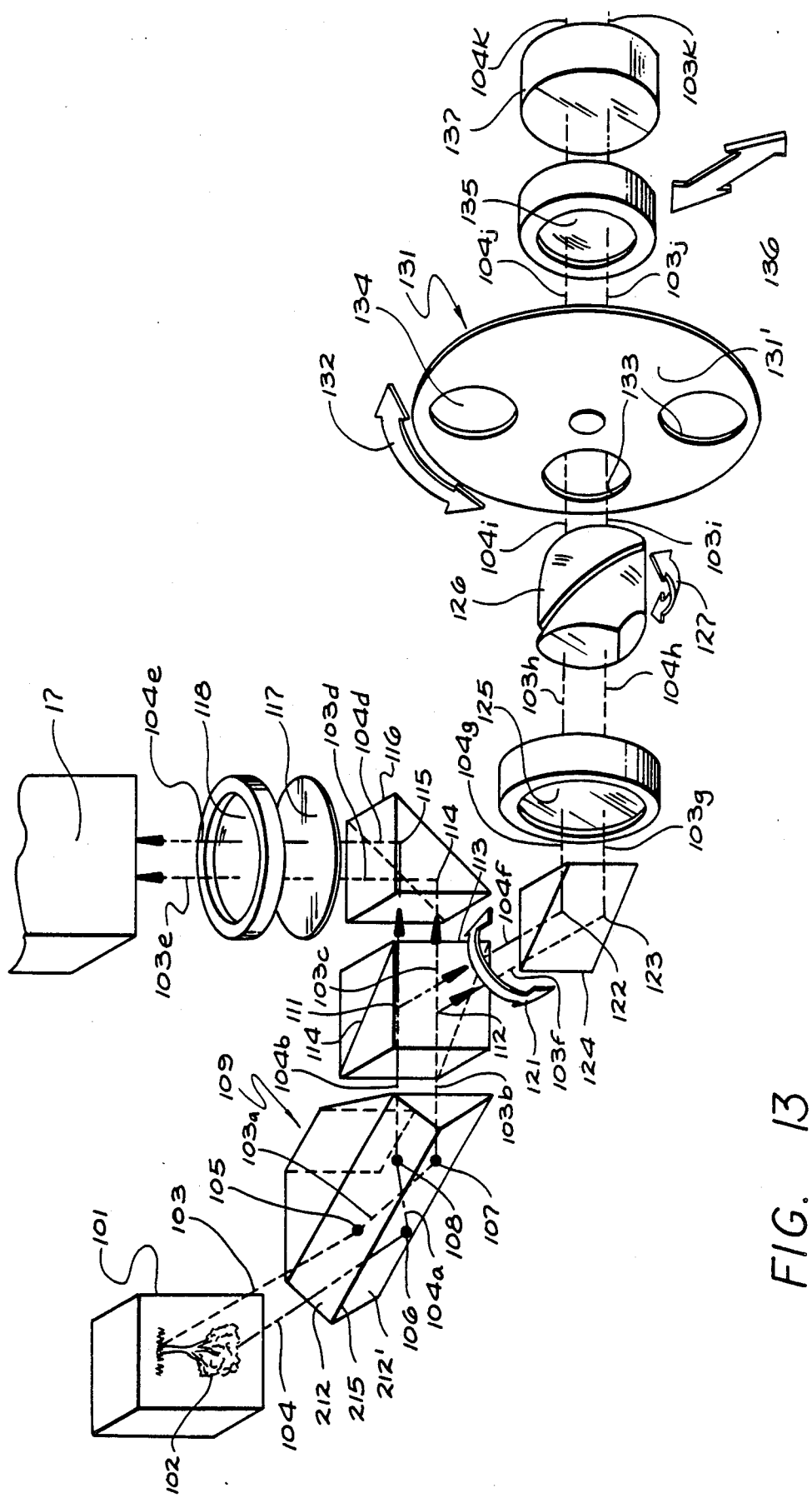

The inside edge of the hole in the side bulkhead of the camera, where my accessory invention is inserted. This view.

FIG. 2 is a side elevation of the FIG. 1 embodiment installed on a motion-picture camera, along with a representative tripod, film magazine, video camera, and ocular.

FIG. 3 is a perspective view of the FIG. 1 embodiment, but taken from a vantage opposite to that of FIG. 1.

FIG. 4 is a plan view of the same embodiment, showing the locations of three optical elements in dashed lines.

FIG. 5 is a partial side elevation, broken away partway along the viewfinder tube, of the same embodiment.

FIG. 6 is a plan view with covers partially cut away and some components partially in section along the line 6-6 of FIG. 5, showing mechanical details of one form of the FIG. 1 embodiment.

FIG. 7 is an end elevation of the viewfinder-tube portion of the FIG. 1 embodiment, taken from the ocular end of the tube.

FIGS. 8 through 10 are respectively a plan view, an end elevation, and a rear-diagonal elevation of an Amici prism, which is used in the FIG. 1 embodiment. To aid in visualizing the slightly complicated shape of this prism, FIGS. 9 and 10 are arranged adjacent to the respective faces of FIG. 8 which they represent.

FIG. 11 is a side perspective view of a Pechan prism.

FIG. 12 is a partial plan view similar to FIG. 6, partly broken away and partly in section, but showing only a portion of the apparatus and showing a different form—or "subembodiment"—of the FIG. 1 embodiment.

FIG. 13 is a perspective drawing of only the optical elements of the FIG. 1 embodiment.

DETAILED DESCRIPTION OF THE PREFERRED EMBODIMENTS

As shown in FIGS. 1 and 2, the apparatus of my invention mounts to a standard professional thirty-five millimeter motion-picture camera 10, which has a left side wall or bulkhead 11. In this side 11 there is formed a cutout 12, whose inner edge 13 is shown in dashed lines. The camera 10 typically is fitted with a lens 14, tripod 15, and film magazine 16.

In the absence of my invention, the cutout 12 is typically occupied by a door (not shown) which hinges at the front of the cutout and carries a fixed viewfinder. The standard, fixed viewfinder conducts an image from a ground glass, just inside the door near the front of the camera, through a port in the door to a reflector just outside the door—and thence through a viewfinder tube (mounted to the outside of the door) to an ocular mounting port toward the rear of the camera.

In some motion-picture cameras the ground glass is at the top, rather than the side, of the camera—but still very near the front. A deflecting prism or mirror above the ground glass directs light rays from the image on the glass to the side of the camera. From that point on, the finder geometry is generally as described above for cameras with the ground glass located at the side.

To either of such standard configurations a conventional "video door" simply adds a beam splitter, partway along the door, for deflecting some of the light upward to a video camera.

My accessory invention is shown generally at 20. Attached to the accessory 20 as illustrated in FIG. 2 are a small video camera 17 and an ocular 18 with its eyecup 19.

My invention includes a mounting plate 21 (FIG. 1) that serves in place of the standard door or "video door." As best shown in FIGS. 4 and 5, the plate 21 carries half-hinges 41 that engage mating half-hinges (not illustrated) just inside the cutout 12 near the front of the camera.

Attached to the mounting plate 21, and thus effectively to the side of the motion-picture camera 10, is a case 22 (FIG. 1). Through a port (not shown here) in the plate 21, the case 22 receives light from the ground glass of the motion-picture camera. At the rear of the case 22 is a video attachment port 23, including a neutral-density filter and control 24 as well as a suitable lens-and-iris combination 25. The lens and iris 25 are adapted to form on the light-sensitive surface of the video camera an image of proper focal properties and intensity for operation of the video camera.

A viewfinder tube 26 is pivoted at one end, by a generally light-tight swivel joint 46, to the case. Within the finder tube 26, as will be detailed shortly, light is received from the case 22 and redirected to the far end of the tube—and into the ocular 18, when present.

Along the way, the light passes through a filter-wheel housing 27 and a reducing-lens housing 28, which in effect form the remote end of the viewfinder tube 26 (FIG. 3). A knurled lock ring 29 (FIG. 1) is provided at the remote end of the reducing-lens housing 28 for attachment of the user's own ocular 18.

Operationally mounted at the bottom of the filter-wheel housing 27 is a control wheel 131" or other suitable control device, for operating a filter wheel within the housing. Through manipulation of the control wheel 131" the operator may position either of two optical filters in the optical path of the viewfinder—or may select a "clear filter" (that is to say, a clear piece of glass) that is also mounted in the wheel, if no filtering is desired; or an opaque section of the wheel 131 when it is desired to prevent light from entering the finder.

Mounted for good visibility at the user's side of the filter-wheel housing 27 is an indicator device 35, with suitable indicia 36, for displaying what condition of the filter wheel has been selected.

A control rod 33 extends upward through a slot 34 formed in the top of the reducing-lens housing 28. With this control the operator can slide a reducing-lens mounting block 33', which is within the housing 28, into or out of the light path—as preferred for viewing all or only part of the scene being photographed.

Some further details of external construction appear in FIGS. 4 and 5. As shown there the construction of the case 22 includes several plates, particularly the outermost panel 62 from which the tube 26 is pivoted, and top panels 42 and 43. The latter are readily removable—after loosening respective groups of mounting screws 44 and 45—for cleaning, adjustment or maintenance of the optics within.

Optical elements within the case 22 include the Amici prism 109, the beam splitter 113, and the upward deflecting prism 116. Conventional optical mounts and retaining elements (not shown) are used within the case.

At this point it will be helpful to consider the overall optical system as shown in FIG. 13. On the ground glass 101, which is within the motion-picture camera, there appears an image 102 of the scene being photographed with the camera.

Light from the image 102 enters the Amici prism 109, which turns the light through a right angle and directs it rearward to the beam-splitting prism 113. Within this two-piece prism 113 is a half-silvered diagonal facet 114 that passes approximately half of the light on rearward to the ninety-degree/forty-five-degree prism 116. This prism 116 simply deflects the light upward through the neutral-density filter 117 and the lens 118 (and iris, not shown) to the video camera 17.

The half-silvered facet 114 in the beam-splitter prism 113 reflects most of the remaining half of the light from the Amici prism outward—roughly parallel to the original light path from the ground glass 101, but offset rearward. If it is desired to divide the light energy unequally, between the viewfinder and video camera, the facet 114 may be silvered at some other fraction than half.

Further, as is known to those skilled in the art of optical systems, the beam splitter 113 need not necessarily be a prism such as here illustrated and discussed, but may instead be some other type of splitter such as, for example, a partially metallized pellicle plate. Well-known performance or maintenance disadvantages, however, usually accrue from such a substitution.

The outward-directed light from the splitter 113 next reaches another ninety-degree/forty-five-degree prism 124. This prism 124 is fixed within the pivoting viewfinder tube 26 (FIG. 1, and FIGS. 3 through 5), and so rotates with that tube. The prism 124 deflects the light from the beam splitter 113 through another ninety-degree angle and along the axis of the finder tube. There the light passes through a relay lens 125, Pechan prism 126, either of two color filters 133 or a "clear filter" 134, reducing lens 135 if present, and ocular 137 to the user's eye.

The clear filter 134 (rather than simply an empty, open port) should be provided in the wheel for unfiltered viewing, to avoid displacement of the focal plane upon movement of the color filters 133 into or out of the optical path. An opaque section 131' of the wheel 131 is needed so that the operator can set the wheel to prevent light from entering the camera through the viewfinder, when the operator's face is not present to block the ocular.

Although it is perhaps instinctive to think of the viewfinder tube and its components as pivoting while the case and its components are stationary, in fact the purpose of the accessory is to facilitate exactly the opposite usage. That is to say, in use the operator wishes to hold the finder tube at an approximately constant height while the camera and the attached accessory case pivot.

(In certain portions of this disclosure and the appended claims it is more logical and communicative to describe the tube and its contained components as pivoting while the case remains stationary. In other portions of the disclosure and claims it is more appropriate to reverse the convention. It is to be understood that these modes of description are equivalent.)

Thus all of the optical elements 109 through 118 that are within the case will pivot, with the motion-picture camera, relative to all the optical elements 124 through 137 that are within the viewfinder tube. In FIG. 13 this motion is symbolized by a curved, broad double-headed arrow 121 at the point of relative rotation—that is, between the beam splitter and the ninety-degree/forty-five-degree prism 124.

Selective operation of the filter wheel 131 is similarly indicated in the drawing by another like arrow 132. Selective movement of the reducing lens 135 out of or into the optical path is represented by a linear double-headed arrow 136.

As suggested in FIG. 13, the image 102 on the ground glass of the motion-picture camera is upside-down, but as in a conventional nontilting finder an inversion is necessarily performed by the relay lens 125. Consequently if there were no other inversions anywhere in the system the image would be right-side-up at the ocular 137—and, as the latter does not invert, the user would see the scene right-side-up.

It is therefore important that the number of inversions occurring in all other elements of the system be an even number—so that the image at the ocular will be right-side-up. At least one other inversion does necessarily occur, for the following reason.

As mentioned earlier, the prism 124 in the finder tube must rotate with that tube. If the light entering the prism 124 contains, for example, a thin vertical image, and the prism 124 is turned to deflect the light rearward, the light leaving the prism 124 contains an image that is likewise vertical. This image can be seen by a person standing behind the apparatus and looking into the prism 124 from the rear along a horizontal path—with suitable focusing, such as relay lens 125—and it will be seen as vertical.

This can be understood by studying respective parallel light rays 104f, 103f from the top and bottom tips of the vertical image: these rays will strike the forty-five-degree reflecting facet of the prism 124 at two points 122, 123 that are along a vertical line in that facet, and they will both be reflected through horizontal ninety-degree angles as illustrated and leave the prism 124 as rays 104g and 103g—with 104g still at the very top and 103g still at the very bottom, just as shown in FIG. 13.

On the other hand, suppose that the camera, accessory case, and optical elements 101 through 118 are rotated through a full ninety degrees to point the camera lens straight downward toward the ground. It is further assumed that the camera is pointed at a thin object which is on the ground but aligned "vertically" in the sense that the image on the film will appear vertical.

Now a person standing behind the apparatus and still looking into the prism 124 from the rear along a horizontal path—and still with necessary focusing—will see the thin image as horizontal. This can be understood by again following the two parallel rays 104f and 103f from the "top" and "bottom" tips of the image.

Under the circumstances just described, the beam splitter 113 is turned—with the camera—so that the "vertical" image is actually horizontal as it enters the ninety-degree/forty-five-degree prism 124. The "bottom" ray 103f will be to the right (as drawn in FIG. 13) of the "top" ray 104f, and will have to travel farther than the "top" ray 104f to reach the reflective forty-five-degree facet of the prism.

The rays will therefore be offset from one another horizontally as viewed by the user. Since they are now assumed to enter the prism 124 aligned horizontally, however, after a horizontal reflection in the prism 124 they will not be offset from one another vertically as seen by the user.

From considering these two extreme cases it will be understood that tilting the camera, the accessory case 124 and the components within the case through a ninety-degree angle—while holding the finder tube at constant height—has the effect of twisting, so to speak, the observed image through the same angle. Smaller tilt angles produce a proportionate twist angle.

It would be extremely awkward to use a tilt viewfinder that was subject to such rotation of the image about the optical path whenever the camera was tilted. It is for this reason that the Pechan prism 126 is included in the system. This prism has the property of twisting the image about the optical path in proportion to rotation of the prism about the optical path.

Consequently provision must be made for rotating the prism by just the right amount to counterrotate the image back through the twist angle introduced by relative rotation between the beam splitter 113 and the ninety-degree/forty-five-degree prism 124. This mechanical arrangement will be detailed shortly, but for present purposes the point to note is that the Pechan prism happens to have an additional property that is important: it introduces an inversion of the image.

This inversion is suggested in the enlarged view of the Pechan prism in FIG. 11: ray 103h entering the prism near the top exits as lower ray 103i, while ray 104h entering the prism near the bottom leaves as upper ray 104i. These same relationships appear in FIG. 13.

As already noted, the total number of inversions permitted in the system—other than the inversion at the relay lens 125—must be even. The Pechan prism introduces just one inversion, so another inversion is required. The Amici prism supplies this added inversion.

FIGS. 8 through 10, considered in conjunction with FIG. 13, may be helpful to an understanding of the operation of the Amici prism 109. The Amici prism 109 has a rather complicated shape, which is further confused by the fact that in my invention two of its corners 213, 214 are advantageously cut off to help fit the prism 109 into the case 22.

Removal of these two corners 213, 214 leaves plane facets 213', 214' that are not optically functional and need not be of optical quality. Likewise the top, rear, and bottom surfaces 212, 217, 218 need not be finished.

The Amici prism 109 has two large planar facets 212, 212', one above and one below its vertical midplane, which are used for internal reflection of light rays. These facets, each angled at forty-five degrees to the vertical, meet each other at a ninety-degree angle along a horizontal line—which may be helpfully regarded as a "folding" line, since in a sense that will be appreciated shortly the image is "folded" vertically at this line.

In my invention light enters the prism through the vertical end face 209 and strikes either the upper or lower forty-five-degree facet 212 or 212'—depending, simply, upon the height and angle of each particular ray.

It is easiest to conceptualize what happens to rays that are "horizontal"—that is, parallel to the top and bottom facets 211 and 218 of the prism. Such a ray that strikes the upper forty-five-degree facet 212 will be deflected downward to the lower forty-five-degree facet 212', and vice versa.

Both rays are then again reflected by the second facet encountered, back into horizontal paths. Rays near the centerline (the folding line) 215 of the prism remain near that line, and rays near the vertical extremes of the prism remain near the vertical extremes, but in both cases the upper and lower rays exchange heights.

Though it may not be intuitively as clear, rays that are not horizontal are similarly returned by two reflections at the forty-five-degree facets 212, 212', preserving their angles to the horizontal (with an inversion), and preserving the relative relationships between all the rays (within the accuracy of the ninety-degree angle at the folding line 215 between those two facets).

In overall net effect, consequently, the Amici prism introduces an image inversion. At the same time, however, if both rays impinge on the forty-five degree facets of the prism at a forty-five degree angle in the horizontal plane, they are turned through a horizontal angle too. Thus, in addition to providing the needed inversion, as previously stated the Amici prism deflects the outward-directed light from the ground glass rearward, with respect to the camera.

This double action is illustrated in FIG. 13, which traces the progress through the entire system of horizontal rays 103 from the top and 104 from the bottom of the ground glass 101. Upper ray 103 strikes the upper forty-five-degree facet 212 of the Amici prism 109 at point 105, where it is deflected as ray 103a downward and laterally within the prism to strike the lower forty-five-degree facet 212' at point 107. From this second internal reflection the ray leaves the prism as lower ray 103b.

Conversely the lower ray 104 strikes the lower forty-five-degree facet 212' of the Amici prism 109 at point 106, where it is deflected as ray 104a upward and laterally within the prism to strike the upper forty-five-degree facet 212 at point 108. From this second internal reflection the ray leaves the prism as upper ray 104b.

These two rays next enter the beam-splitter prism, which divides their energy between video-camera path and the viewfinder path without altering their relative orientation. More specifically, the upper ray 104b entering the beam splitter becomes both the upper ray 104c entering the video-tap deflector prism 116 and the upper ray 104f entering the viewfinder deflector prism 124; and similarly for the splitting of the lower ray 103b into lower rays 103c and 103f.

A difference in orientation does, however, arise in the video-tap deflector prism 116. Here the upper ray 104c travels further to the deflector's forty-five-degree facet, which it strikes at a point 115 near the rear of the prism, than does the lower ray 103c, which strikes at point 114 near the front of the prism. Thus the image may be considered to undergo a twist through ninety degrees at this prism; however, since the orientation of the video camera 17 about the optical axis is controllable arbitrarily, this twisting is inconsequential.

Now considering the viewfinder part of the system, upper and lower rays 104f and 103f entering the deflector prism 124 strike the reflecting forty-five-degree facet at points 122 and 123 respectively, and—subject to relative rotation 121 as already explained—proceed as upper and lower rays 104g and 103g to the relay lens 125.

This lens 125 reimages with an inversion, so that the entering upper ray 104g leaves the lens 125 as the lower ray 104h; while conversely the entering lower ray 103g leaves as the upper ray 103h.

The Pechan prism 126 too introduces an inversion—plus-or-minus a twist of as much as ninety degrees, or even more. The size of the twist varies with the relative rotation 121 of the two halves of the optical system as already explained. Thus the upper ray 103h entering the Pechan prism 126 exits as the lower ray 103i, while the lower ray 104h entering exits as the upper ray 104i.

Since none of the other elements in the system affects the image orientation as such, the upper ray 104i leaving the Pechan prism 126 passes onward as the upper ray 104j into the reducing lens 135 (if it is moved into the beam) and the ocular 137, and as the upper ray 104k between the ocular and the user's eye. Similarly the lower ray 103j from the Pechan prism continues as the upper ray 104j, 104k into and out of the ocular.

With this understanding of the optical system in mind, it remains to discuss certain mechanical details of my invention. Those that are essentially external appear in FIGS. 4 and 5.

An adjustable knurled ring 46 controls the amount of frictional drag in the pivoting of the finder tube 26 relative to the case 22. A desired setting of the friction control ring 46, once found, can be maintained by tightening a locking lever 47 against a locking tab 48.

The finder tube 26 is made up of sections 51, 52, 54, that are held together and to the filter-wheel housing 27 by screws 53 and 55. Similarly, the filter-wheel housing 27 is made up of two sections that are held together by screws 56, and the reducing-lens housing 28 has a cover that is held to the body of the housing by screws 57.

As suggested in FIGS. 3 and 7, the reducing lens 135 is out of the optical path when the control rod 33 is positioned at the outboard side of the lens housing 28. When the user slides the rod 33 to the other end of its slot 34, in line with the ocular mounting port 32, the attached lens 135 correspondingly moves into place to reduce the image as seen at the ocular.

FIG. 6 illustrates the mounting and inner mechanics of the finder tube. In this drawing the cover surfaces are cut away at 202 and 203. First it may be noted that the outermost plate 62 of the case 22 is apertured at 65, for passage of light from the beam splitter 113 (FIGS. 4 and 13) into the finder tube.

Fixed to the outside of the plate 62, by screws 68 that are threaded into the plate 62, is a mounting ring 67. This mounting ring is aligned with the aperture 65, and provides a ledge for attachment of a ring gear 84: the gear is formed as a cylinder 81 with a flange 82, and a mounting screw 83 passes through the flange 82 into the ledge of the mounting ring 67.

The internal cylindrical surface 81' of the ring gear 84 serves as a continuation of the aperture 65 for the purpose of passing light from the beam splitter to the deflecting prism 124 in the viewfinder tube 26.

Adjacent to the mounting ring 67 that is fixed to the plate 62 is a corresponding mounting ring 73 that is fixed to and is part of the viewfinder tube. The tube mounting ring 73 carries an outwardly projecting peripheral flange 73f. This external flange 73f is captured behind an internal flange 71 of a friction ring 69, which is threaded at 72 to the periphery of the plate mounting ring 67. As illustrated, the flange 73f is preferably protected from the plate mounting ring 67—and particularly from the edges of the counterbores for the mounting screws 68 in that ring—by a washer 66.

Tightening the friction ring 69, by threading it further onto the plate mounting ring 67, increases the friction or drag between the tube mounting ring 73 and the flange 71 of the friction ring 69. The operator can use this variable drag to stabilize the relative angular position of the tube and case when desired, while permitting movement when desired.

Within the tube 26, a conventional retainer plate 201 is provided to hold the prism 124 in place.

The ring gear 84 has forty-seven-degree teeth. Engaged with these teeth is a spur 75, that is rotatably pinned to a forty-seven-degree pedestal formed at the interior edge of the plate mounting ring 73. The spur teeth (or equivalent) are also engaged with forty-seven-degree teeth of another ring gear 85, which is mounted for rotation within a ring bushing 88.

The reason for departure of the teeth and pedestal from the more natural forty-five-degree angle is that the viewfinder tube 26 actually is not parallel to the outboard plate 62 of the case 22 but angled outward slightly—four degrees, to be exact—so that it is further from the case at the rear than at the front.

This small angle, together with an additional angle of about six degrees between the mounting plate 21 and the outboard plate 62 of the case, causes the viewfinder tube 26 to swing outward from the camera whenever the camera is tilted downward or upward. This outward swinging action is desirable to provide additional clearance between the operator's head and the film magazine and video camera mounted to the top of the motion-picture camera, and other bulky attachments that may be mounted to the underside of the motion-picture camera.

Since there is a four-degree angle between the case and tube, the "corner" around which the motion must be transmitted contains an "extra" four degrees—that is to say, it is a ninety four-degree corner. The extra four degrees is simply shared, at the two sides of the spur 75, with both of its meshing ring gears 84 and 85. Hence each of the three meshing elements has forty-seven-degree teeth or equivalent.

Here again, the ring gear 85 is formed at one end of a cylinder 86, whose inner surface 86' serves as an aperture for passage of the light between the deflector prism 124 and the relay lens 125. At the other end of the cylinder 86 is a third ring gear 87. When the finder tube 26 is pivoted relative to the plate 62, the spur 75 is forced to roll around the outside of the first-mentioned ring gear 84, which is stationary relative to the plate 62.

In rolling around the stationary ring gear 84 while in mesh with both of the first two ring gears 84 and 85, the spur 75 forces the second ring gear 85 to rotate about its own axis. Thus the spur accurately transfers the pivoting of the tube into rotation of the second ring gear 85.

This rotation of the second ring gear 85 is transmitted through the body of the cylinder 86 to the third ring gear 87, at the remote end of the cylinder 86. Engaged with and turned by the third ring ring 87 is a planetary element 97, which in the illustrated embodiment is a planetary gear.

The planetary 97 is pinned at 92 to the periphery of a stepped barrel 91, 94s, 94. This barrel has two sections of different diameters—one section 91 that is nearer the third ring gear 87 and that is of relatively small diameter, and another section 94 that is nearer the filter-wheel housing 27 and that is of relatively large diameter.

These two sections 91 and 94 are interconnected by an annular step or ledge 94s, and the barrel is mounted for rotation within a ring bushing 96. The bush 96 is held fixed within the tube by a setscrew 97. Fixed to or integral with the bushing 96 is a fourth ring gear 95, which is thus also fixed with respect to the viewfinder tube 26. Engaged with this fourth ring gear 95 is the planetary 97 mentioned earlier.

In forcing the spur 97 to rotate, the third ring gear 87 also forces the spur 97 to roll around the fixed fourth ring gear 95. This motion of course requires that the axis of rotation of the spur—that is, the pin 92—revolve bodily about the optical path. The pin 92, being embedded in the smaller-diameter section 91 of the barrel 91-94s-94, forces the barrel to revolve about its own axis.

As previously mentioned, such a drive causes the barrel 91-94s-94 to rotate through just half the angle of rotation of the third ring gear 87. Thus the barrel rotates through exactly half the angle of pivoting of the finder tube 26 relative to the case 22.

Mounted within the larger-diameter section 94 of this barrel is the Pechan prism 126, which is thus forced into rotation through an angle equal to half the angle of pivoting of the tube 26 relative to the case 22. The relay lens 125 too is mounted within the barrel 91-94s-94, but only for convenience since the lens 125 need not be rotated. On the other hand, as the lens 125 is cylindrically symmetrical its rotation does not interfere with performance of the system.

At the remote end of the viewfinder tube proper 26 is the filter-wheel housing peripheral wall 27. This peripheral wall 27 overlaps the finder tube proper 26—and is secured to it and to the bulkhead 27a of the filter-wheel housing by screws 98. Formed in the bulkhead 27a is an aperture 27b for passage of the light beam.

Also desirable are a suitable detent mechanism (not shown) to hold the filter wheel 131 in any selected position, a control wheel 131" or other control device for the operator's use in rotating the wheel 131, and an indicator 35 of any suitable kind with an operational linkage (not shown) to the filter wheel as necessary. The detent, control device, and indicator linkage if required may all be conventional.

Secured to or integral with the bottom of the reducing-lens housing 28a is a dovetail track 28c or other suitable guideway for the reducing-lens holder 33'. If preferred the reducing-lens holder 33' may be movably mounted in any other suitable fashion—e.g., pivoted to swing in and out of the optical path. The reducing lens 135 is mounted within this holder 33', and the reducing-lens control rod 33 is mounted to the top of this same holder 33' and as previously described projects upward through the slot 34 (FIG. 3) in the housing cover 28.

At the remote end of the reducing-lens housing 28a is an extended cylindrical port 28b, which terminates in an external flange 28c. Loosely surrounding this port and flange 28b, 28c is an internally threaded mounting ring 29 for direct attachment to the user's ocular. The mounting ring 29 has at its nearer edge an internal flange 29a; and a washer 99 is captured between this internal flange 29a and the external flange 28c of the port 28b.

The optical system of my invention is, as mentioned earlier, extremely sensitive to backlash in the mechanical system described above for rotation of the Pechan prism 126. This sensitivity can be adequately controlled by using extremely high-precision machining for all of the ring gears 84, 85, 87 and 95, and the spur 75 and planetary 93 as well.

It now appears that equivalent operational quality can be achieved at substantially lower cost by using a friction wheel rather than a gear for the planetary element 93—and perhaps also for the spur 75. As shown in FIG. 12, a suitable friction wheel can be provided in the form of a pulley-like wheel 93a with a circumferential O-ring groove, and an O-ring 93b fitted in the groove. The O-ring 93b may be frictionally engaged with the teeth of the ring gears 87 and 95 or other suitable annular friction surfaces.

Substitution of friction wheels—whether of the O-ring type described here or of any other type—for gears would not be practical in motional transmission systems considered generally. Slippage, wear and erratic behavior of friction wheels would be expected in almost all such systems, and it seems fair to say that the teaching of the prior art would be counter to such a substitution.

Accordingly a part of the present invention consists in the recognition that the operating conditions for the mechanism here are qualitatively different from operating conditions for the great majority of all transmission systems—and that this difference can be turned to advantage in use of friction wheels for present purposes.

The dispositive difference is in the speed and speed of operation. Most mechanical linkages are expected to rotate through many revolutions and at angular velocities measured in hundreds to thousands of revolutions per minute. By contrast, the linkage of the present invention will probably never be rotated through more than a quarter of a revolution—and that at probably no more than ten revolutions per minute.

It is therefore believed that a friction wheel such as described will perform very adequately in terms of slippage, reliability and wear. Even if wear is found significant over a period of weeks or months, the economics of the friction-wheel approach may yet be superior: a worn O-ring can be readily thrown away and replaced at a cost of pennies, on occasion of regular maintenance sessions.

The following rough parameters will be helpful to persons skilled in the art. The plate 21 is 4 7/16" maximum height, 5 7/16" long, and ⅝" thick. The case 22 is 5 7/16" maximum length, 2 9/16" tall, and 2 9/16" maximum width excluding the plate 21. The locking ring 46 is ¾" wide and 3" in diameter. The finder tube 20 is 7" long excluding the ocular. The narrow part of the finder tube is 2" wide, and the larger end 3⅝" in diameter. The lens focal lengths are 60 mm for the reducer 135, 120 mm for the relay 125, and 45 mm for the video link 118. The beam-splitter 113 and forty-five/ninety-degree prisms 116, 124 are 1" tall and have square entry and exit faces. The Pechan prism, 1" long (along the optical path), is obtained in a square cross-section oversize, cut to 1" width, and its top and bottom rounded to 1¼" diameter. The Amici prism is of BK7 glass, 1 9/16" tall (to capture the entire image at the immediately adjacent ground glass); before its corners are removed the entry and exit faces are 2⅛" maximum width, the fold line 215 about 4 9/16" long.

The foregoing disclosure is meant as merely exemplary, and not to limit the scope of the invention—which is to be determined by reference to the appended claims.

I claim:

1. An accessory video door and tilt viewfinder for use with an ocular and with a video camera, and with a motion-picture camera which has a side, and which throws onto a ground glass in the motion-picture camera an inverted image of a scene; said accessory comprising:
   a case adapted to be supported from such motion-picture camera adjacent to such ground glass, and to receive from such image light rays that are generally at a right angle to such side of the motion-picture camera;
   an Amici prism, disposed within the case, for redirecting light rays from the image on the ground glass rearward within the case, with an inversion of the image;
   a video attachment port in the case, behind the Amici prism, for attachment of such video camera to monitor such scene;
   a beam splitter that passes part of the light from the Amici prism rearward to the video attachment port, and that deflects part of the light from the Amici prism outward from the case generally at a right angle to such side of the motion-picture camera;
   a viewfinder tube having two ends, a first one of the ends being pivotally mounted to the case, for receiving the light rays deflected by the beam splitter;
   an attachment port, defined at a second end of the tube, for mounting of such ocular;
   a reflector within the tube near the first end, for intercepting the light rays deflected by the beam splitter and for redeflecting the intercepted light along a pivoting optical path, within the tube;
   a relay lens within the tube for receiving the redeflected light from the reflector and relaying such image to a point near such ocular for viewing; and
   a Pechan prism, rotatably secured within the tube, for counterrotating the relayed image in compensation for image rotation due to pivoting of the tube and reflector.

2. The accessory of claim 1, wherein:
   in use the relay lens reimages the ground-glass image between the Pechan prism and such ocular.

3. The accessory of claim 1, further comprising:
   a motional relay device mounted to the tube, actuated by pivoting of the tube relative to the case, and operatively connected to rotate the Pechan prism about the pivoting optical path to effect said compensation.

4. The accessory of claim 1, further comprising:
   a first ring gear fixed with respect to the case;
   a spur, rotatably fixed to the tube and engaged with the first ring gear, for rotation by the first ring gear in response to pivoting of the tube relative to the case;
   motional transmission means operably mounted to the tube for actuation by the spur to transmit motion, derived from rotation of the spur, along the tube toward the second end of the tube;
   a barrel rotatably fixed within the tube for rotation about the pivoting optical path, and carrying the Pechan prism, and operatively connected for rotation by the motional transmission means;
   whereby pivoting of the tube relative to the case rotates the Pechan prism about the pivoting optical path to effect said compensation.

5. The accessory of claim 4, wherein the motional transmission means comprise:
   a second ring gear rotatably mounted within the tube and engaged with the spur for rotation thereby about the pivoting optical path;
   a third ring gear integral with the second ring gear and rotating therewith;
   a fourth ring gear fixed within the tube; and
   a planetary element mounted to the barrel for rotation therewith and also rotatable, relative to the barrel, about an axis of the planetary element itself, said axis being fixed with respect to the barrel;
   the planetary element being engaged at one side with the third ring gear for rotation thereby; and
   the planetary element being engaged at another side with the fourth ring gear to force the axis of the planetary element, and with it the barrel, to rotate about the pivoting optical path in response to rotation of the planetary element.

6. The accessory of claim 5, wherein:
   the planetary element is a planetary gear having teeth meshed with the third ring gear at said one side and with the fourth ring gear at said other side.

7. The accessory of claim 5, wherein:
   the planetary element is a planetary friction wheel having a substantially untoothed compliant engagement surface that is forcibly pressed against the third ring gear at said one side and against the fourth ring gear at said other side.

8. The accessory of claim 5, wherein the planetary element comprises in combination:
   a planetary wheel having defined in its periphery a circumferential O-ring groove; and
   an elastomeric O-ring that is mounted in the groove, and that is forcibly pressed against the third ring gear at said one side and against the fourth ring gear at said other side.

9. The accessory of claim 4, wherein the spur is a spur gear that:
   has teeth meshed with the first ring gear; and
   is operatively connected to actuate the motional transmission means.

10. The accessory of claim 4, wherein the spur is a friction wheel that:
    has a substantially untoothed compliant engagement surface which is forcibly pressed against the first ring gear; and
    is operatively connected to actuate the motional transmission means.

11. The accessory of claim 4, wherein the spur comprises in combination:
    a wheel operatively connected to actuate the motional transmission means, and having defined in its periphery a circumferential O-ring groove; and
    an elastomeric O-ring that is mounted in the groove, and that is forcibly pressed against the first ring gear.

12. The accessory of claim 1, for use with a bulky film magazine mounted to the top of such motion-picture camera and extending rearward and upward therefrom, and for use with a video camera mounted to the top of the case and extending rearward therefrom; and wherein:
    the reflector is disposed and oriented so that the ocular attachment port is spaced well away from such side of the motion-picture camera to provide ample clearance between a user's head and both such film magazine and such video camera even when such motion-picture camera is tilted steeply upward.

13. The accessory of claim 1, for use at the left side of such motion-picture camera, and for use with a bulky film magazine mounted to the top of such motion-picture camera and extending rearward and upward therefrom, and for use by a person who sights through the viewfinder with the left eye; and wherein:
    the center of the ocular attachment port is spaced at least four inches from such side of the motion-picture camera to provide clearance between the right side of such user's head and such film magazine even when such motion-picture camera is tilted steeply upward and such user is sighting through the viewfinder with the left eye.

14. The accessory of claim 1, further comprising:
    a reimaging lens and iris mounted to the case adjacent to the video attachment port, for reimaging such scene with adjustable intensity upon light-responsive elements of such video camera.

15. The accessory of claim 1, further comprising:
    a neutral-density filter mounted to the case adjacent to the video attachment port, for reducing the intensity of such reimaged scene before it reaches such video camera.

16. The accessory of claim 1, further comprising:
    a filter holder carrying a plurality of optical filters and movably mounted to the accessory for selective positioning of any one of the plurality to intercept and filter light traveling from such ground-glass image toward such ocular; and
    a manually operable control mounted to the tube near the ocular, for moving the filter holder to select among the plurality.

17. The accessory of claim 1, further comprising:
    a filter holder carrying a plurality of optical filters and movably mounted to the tube between the Pechan prism and the ocular, for selective positioning of any one of the plurality in the pivoting optical path; and
    a manually operable control mounted to the tube near the ocular, for moving the filter holder to select among the plurality.

18. The accessory of claim 1, further comprising:
    an additional lens, movably mounted to the accessory, for selective positioning to intercept and change the focal properties of light traveling from such ground-glass image toward such ocular; and
    a manually operable control mounted to the tube near the ocular, for moving the additional lens to select desired focal properties.

19. The accessory of claim 1, further comprising: an additional lens, movably mounted to the tube between the Pechan prism and the ocular, for selective positioning:
    on the pivoting optical path to change the size of such reimaged scene by approximately a factor of two, or
    off the pivoting optical path to leave the size of such reimaged scene unchanged; and
    a manually operable control mounted to the tube near the ocular, for moving the additional lens to select either the changed or the unchanged size as desired.

20. The accessory of claim 1, in further combination with such ocular.

21. The accessory of claim 1, in further combination with such video camera.

22. The accessory of claim 21, in further combination with such ocular.

23. The accessory of claim 1, in further combination with such motion-picture camera.

24. The accessory of claim 23, in further combination with such ocular.

25. The accessory of claim 23, in further combination with such video camera.

26. The accessory of claim 25, in further combination with such ocular.

27. An accessory video door and tilt viewfinder for use with an ocular and with a video camera, and with a motion-picture camera which throws onto a ground glass at the side of the motion-picture camera, very near the front thereof, an inverted image of a scene; said accessory comprising:
    a case adapted to be supported from such motion-picture camera adjacent to such ground glass, and to form a substantially light-tight seal with such motion-picture camera; said case in use accepting from such image, very near the front of such motion-picture camera, light rays that are generally at a right angle to such side of the motion-picture camera;
    a viewfinder tube having two ends, a first one of the ends being pivotally mounted to the case and forming a substantially light-tight seal with the case, said tube in use receiving from the case light rays originating from such image;
    an attachment port, defined at the second end of the tube, for mounting of such ocular;
    a reflector within the tube near the first end, for receiving light rays from the case, generally at a right angle to such side of the motion-picture camera, and for deflecting the received light along a pivoting optical path, within the tube, that is very generally parallel with such side of the motion-picture camera;

a relay lens, substantially fixed within the tube, for receiving deflected light from the reflector and relaying such image to a point near such ocular for viewing, the lens also having the effect of inverting the image;

the relayed image at said point being subject to rotation about the pivoting optical path, due to pivoting of the tube relative to the case;

a Pechan prism, rotatably secured within the tube, for counterrotating the relayed image in compensation for said image rotation due to pivoting of the tube, the Pechan prism also having the effect of inverting the image;

an Amici prism, disposed within the case, for redirecting light rays from the image on the ground glass along a fixed optical path within the case, rearward of such motion-picture camera and generally parallel to such side of the motion-picture camera, and for inverting the image to compensate for inversion by the Pechan prism;

a video attachment port in the case, behind the Amici prism relative to such motion-picture camera, for attachment of such video camera to monitor such scene; and a beam splitter that passes part of the light from the Amici prism rearward of such motion-picture camera to the video attachment port, and that deflects part of the light from the Amici prism generally at a right angle to the fixed optical path, for passage to the reflector within the tube;

whereby the Amici prism and beam splitter in combination facilitate reimaging of such scene at such video camera, and also effectively move such ground-glass image rearward of such motion-picture camera, away from the front thereof, for passage into the tube, so that the tube is clear of the front of such motion-picture camera; and whereby such cameras and ground-glass image, and the case, may be tilted vertically while such viewfinder tube and relayed image, and the ocular, may be held at a substantially unchanged position vertically with such relayed image maintained substantially erect.

* * * * *